United States Patent
Es-Souni

(10) Patent No.: US 8,197,884 B2
(45) Date of Patent: Jun. 12, 2012

(54) PROCESS FOR PRODUCING A SOL-GEL-BASED ABSORBER COATING FOR SOLAR HEATING

(75) Inventor: Mohammed Es-Souni, Mielkendorf (DE)

(73) Assignee: Zyrus Beteiligungsgesellschaft mbH & Co. Patente I KG (DE)

( * ) Notice: Subject to any disclaimer, the term of this patent is extended or adjusted under 35 U.S.C. 154(b) by 651 days.

(21) Appl. No.: 12/306,061

(22) PCT Filed: Jun. 19, 2007

(86) PCT No.: PCT/DE2007/001090
§ 371 (c)(1),
(2), (4) Date: Dec. 22, 2008

(87) PCT Pub. No.: WO2007/147399
PCT Pub. Date: Dec. 27, 2007

(65) Prior Publication Data
US 2009/0269487 A1    Oct. 29, 2009

(30) Foreign Application Priority Data
Jun. 21, 2006  (DE) .................. 10 2006 028 429

(51) Int. Cl.
*B05D 5/12* (2006.01)
*B05D 3/02* (2006.01)

(52) U.S. Cl. ... 427/74; 427/97.6; 427/126.1; 427/126.3; 427/126.5; 427/383.1; 427/553; 427/557

(58) Field of Classification Search .................. None
See application file for complete search history.

(56) References Cited

U.S. PATENT DOCUMENTS

| | | | |
|---|---|---|---|
| 5,350,644 A * | 9/1994 | Graetzel et al. | 429/111 |
| 5,912,045 A * | 6/1999 | Eisenhammer et al. | 427/125 |
| 5,985,691 A * | 11/1999 | Basol et al. | 438/95 |
| 6,951,666 B2 * | 10/2005 | Kodas et al. | 427/376.6 |
| 2002/0158297 A1 * | 10/2002 | Suwa-Shi et al. | 257/449 |
| 2006/0189155 A1 * | 8/2006 | Basol | 438/765 |
| 2007/0111367 A1 * | 5/2007 | Basol | 438/95 |

FOREIGN PATENT DOCUMENTS

| | | |
|---|---|---|
| WO | 96/37739 A | 11/1996 |
| WO | 97/38145 | 10/1997 |

OTHER PUBLICATIONS

Traversa, Enrico, et al. "Sol-Gel Preparation and Characterization of Ag-TiO2 Nanocomposite Thin Films", Journal of Sol-Gel Science and Technology 19, pp. 733-736 (2000).

Zhang, Lizhi, et al., "Ambient Light Reduction Strategy to Synthesize Silver nanoparticles and Silver-Coated TiO2 with Enhanced Photocatalytic and Bactericidal Activities", Langmuir 2003, vol. 19, pp. 10372-10380.

He, Chao, et al., "Influence of Silver Doping on the Photocatalytic Activity of Titania Films", Applied Surface Science 200, pp. 239-247 (2002).

\* cited by examiner

*Primary Examiner* — Jeffrey Wollschlager
(74) *Attorney, Agent, or Firm* — Brooks Kushman P.C.

(57) ABSTRACT

Process for producing a solar absorber coating, which comprises the steps: coating of a substrate with a titanium precursor solution to produce a titanium dioxide layer by the sol-gel technique and heat treatment of the coated substrate to pyrolyse and crystallize the layer, characterized in that silver ions are added to the titanium precursor solution prior to coating in such an amount that the heat-treated layer has a proportion by mass of silver in the range from 10% to 80% and pyrolysis and crystallization of the layer are carried out with illumination of the layer with visible light.

9 Claims, 3 Drawing Sheets

PROCESS FOR PRODUCING A SOL-GEL-BASED ABSORBER COATING FOR SOLAR HEATING

FIELD OF THE INVENTION

The invention relates to a process for producing an absorber coating for solar heating, which is based on a sol-gel process and with which layers can be applied to virtually any substrates.

BACKGROUND OF THE INVENTION

Solar collectors utilize incident solar radiation by absorbing visible light and converting this electromagnetic energy to heat. The heat is generally released to a heat-storing, free-flowing medium and supplied to a storage reservoir by the flow. Solar collector surfaces consist typically of coated copper or aluminum sheets which are welded to pipelines in order to ensure good heat transfer into the storage medium conducted within the tubes.

The ultimately achievable useful heat depends significantly on the absorption capacity of the collector coating, which must ideally be high for light over the entire solar spectrum. However, the heat thus obtained must at the same time not be emitted again in the infrared spectrum to an excessive degree. The coating is therefore additionally required to have a low emission capacity in the wavelength range above about 2000 nanometers, which is associated with a high reflectivity in this spectral region.

Absorber coatings which satisfy the stated demands are already commercially available and are referred to as selective. Large-area production is possible in highly optimized coating plants, for instance by means of physical vapor deposition (VPD) for example onto continuous copper ribbons, which allows coated areas of several square meters per hour to be achieved. Additionally known are sputtering processes and also a combined CVD/sputtering process. However, these are high-vacuum processes with a considerable level of apparatus complexity. For further information, reference is made at this point to the publication BINE projektinfo 5/99 from the BINE information service published by the Fachinformationszentrum Karlsruhe.

As is well known, robust, firmly adhering coatings with long-term thermal and chemical stability can also be obtained by sol-gel coating methods. The advantages of such methods, as well as the low demands on equipment and process control, lie in the high variability of the usable materials with regard to composition and layer structure, in the means of coating virtually any nonplanar surfaces, in the relatively low energy demand and not least in the combinability of different coating steps to obtain multifunctional layers, as can be achieved with other known processes with a barely acceptable level of cost and inconvenience, if at all. From that point of view, it seems astonishing that so little attention has been paid to date to the production of solar absorber layers by means of sol-gel methods.

The sole currently know exception and hence, at the same time, closest prior art is the patent DE-C2 101 21 812 which protects a process for producing a selective absorber layer by dip-coating. To this end, a titanium-containing oxide layer, which is said to contain so-called selectively absorbing structural elements, is formed on a magnesium-containing aluminum sheet. Unfortunately, though, it is not clearly evident from the publication what the nature or what the origin of these "structural elements" is supposed to be. This leads at first to the suspicion that specifically a titanium dioxide coating of the substrate as the absorber might be what is meant. However, this would be clearly contradicted by experimental findings (see also FIG. 1). It therefore remains to be assumed that the specific reference to the Mg—Al substrate is essential to the invention here and an oxidation of the substrate surface itself—perhaps a result of the additions of nitric acid?—is brought about in order to achieve the absorber effect described. If this were to be the case, the method here would not be a conventional sol-gel coating but a chemical surface treatment. In any case, the teaching of DE-C2 101 21 812 does not give any reason to believe that the coating described there might be a solar absorber coating for a plurality of—or even virtually any—substrates.

It is thus an object of the invention to specify a process for producing an absorber coating favorable for solar heating, by which the layers can be formed with known sol-gel coating methods (spraying, dipping, spinning) on various substrates, especially on copper, aluminum, stainless steel or glass.

SUMMARY OF THE INVENTION

The object is achieved by a process for producing a solar absorber coating having the features of claim 1. The subclaims specify advantageous configurations.

The process according to the invention consists in the conventional coating, which is known per se, of a substrate with a titanium dioxide layer using a precursor solution which is applied to the substrate by a sol-gel process and then heat-treated, now extended by two inventive steps:
  silver ions (for example in the form of silver nitrate solution) are added to the precursor solution before the coating such that the proportion by mass of silver in the $TiO_2/Ag$ layer dried at a later stage is between 10% and 80%, more preferably between 50% and 70%;
  the coated substrate is illuminated over the entire heat treatment (drying and crystallization) with visible light (preferably with a power density in the range from 25 $mW/cm^2$ to 70 $mW/cm^2$).

The effect of these inventive measures consists in a considerable enhancement of the absorption capacity of the coating for visible light (approx. 400-700 nm) and tor the adjoining near infrared spectrum with a declining trend, i.e. within a very broad spectral range, the effect depending essentially on the silver concentration used. Experiments on layers with a proportion by mass of silver of 10% to 80% have been carried out, and it was found that the range between 50% and 70% provides particularly good results.

BRIEF DESCRIPTION OF THE DRAWINGS

The effect described is illustrated by the following figures.

DETAILED DESCRIPTION OF THE PREFERRED EMBODIMENTS

Figure 1:
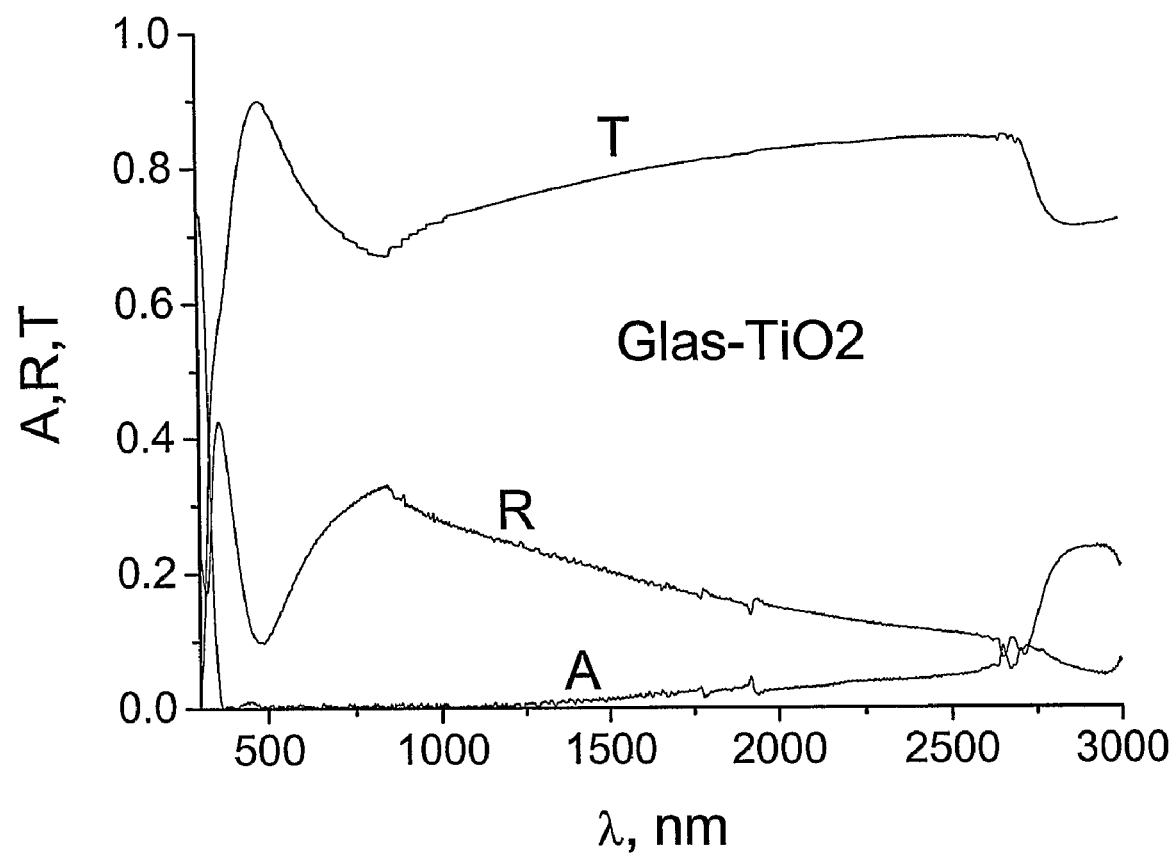
FIG. 1 shows the result of a photometric analysis for a pure $TiO_2$ layer (anatase phase, thickness 100 nm) on a glass substrate with measurements of the reflectivity R, the transmissivity T and the absorption capacity A.

A pure titanium dioxide layer is unsuitable as a solar absorber, as is clearly evident from FIG. 1. What are shown are transmission, reflection and absorption capacity (T, R, A) of a glass plate coated with 100 nm of $TiO_2$. The glass plate itself was also analyzed uncoated, such that the measurements shown are corrected by this and should be understood as layer properties. Pure $TiO_2$ lets about 80% of the incident light power through up to about 2700 nm and reflects the rest. The absorption assumes values above 10% only in the infrared beyond 2700 nm.

Figure 2:
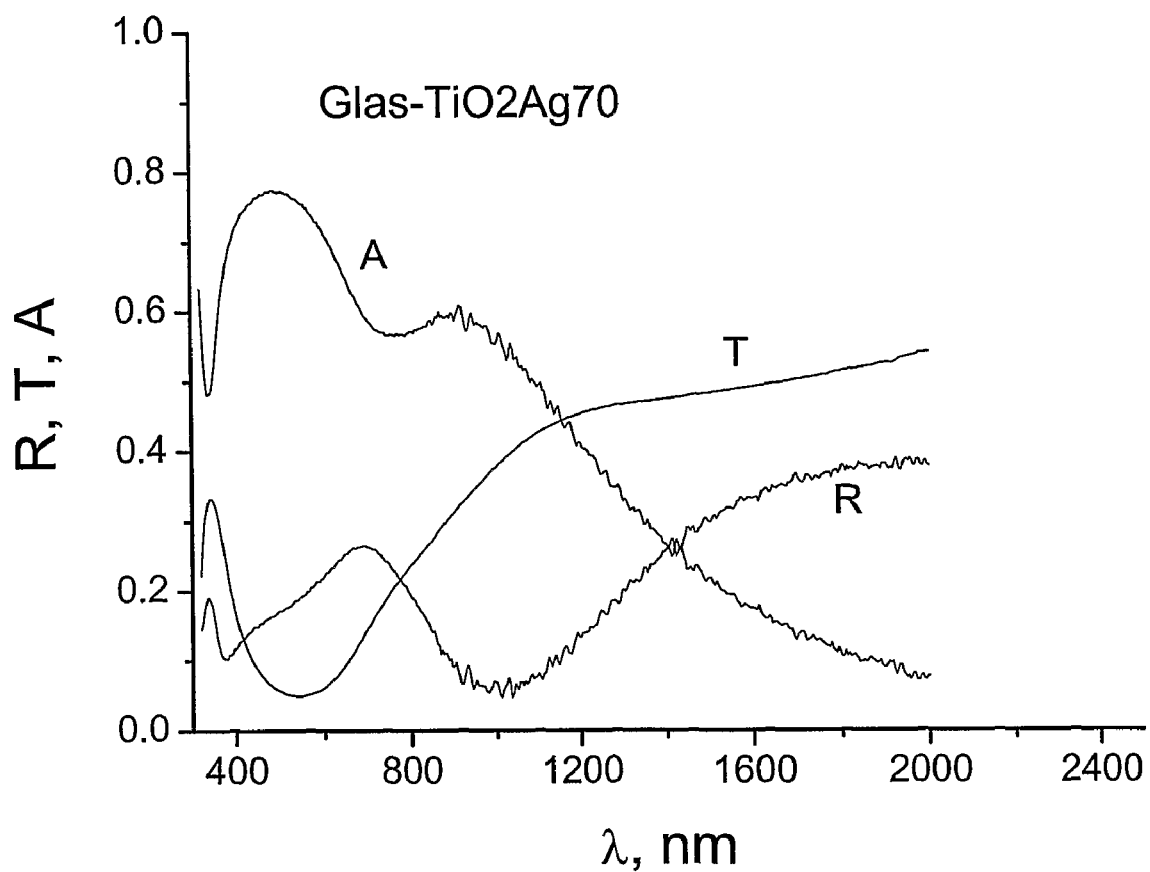
FIG. 2 shows, for comparison, the same analysis as in FIG. 1 on a $TiO_2/Ag$ layer (100 nm) with a proportion by mass of silver of 70%, and pyrolyzed and crystallized under light.

An identical glass plate was coated by the inventive teaching with a 100 nm-thick $TiO_2$/Ag layer (proportion by mass of silver 70%) and analyzed as above. It can be inferred from FIG. 2 that this layer absorbs a good 70-80% of the light in the visible wavelength range (approx. 400-700 nm), predominantly reflects the rest and allows only a little light through. This fundamentally different behavior compared to pure $TiO_2$ is then "normalized" to a little toward greater wavelengths; at 2000 nm, a T:R:A ratio of about 55:35:10 is found for the inventive layer, compared to about 80:15:5 for $TiO_2$ (cf. FIG. 1).

Figure 3:
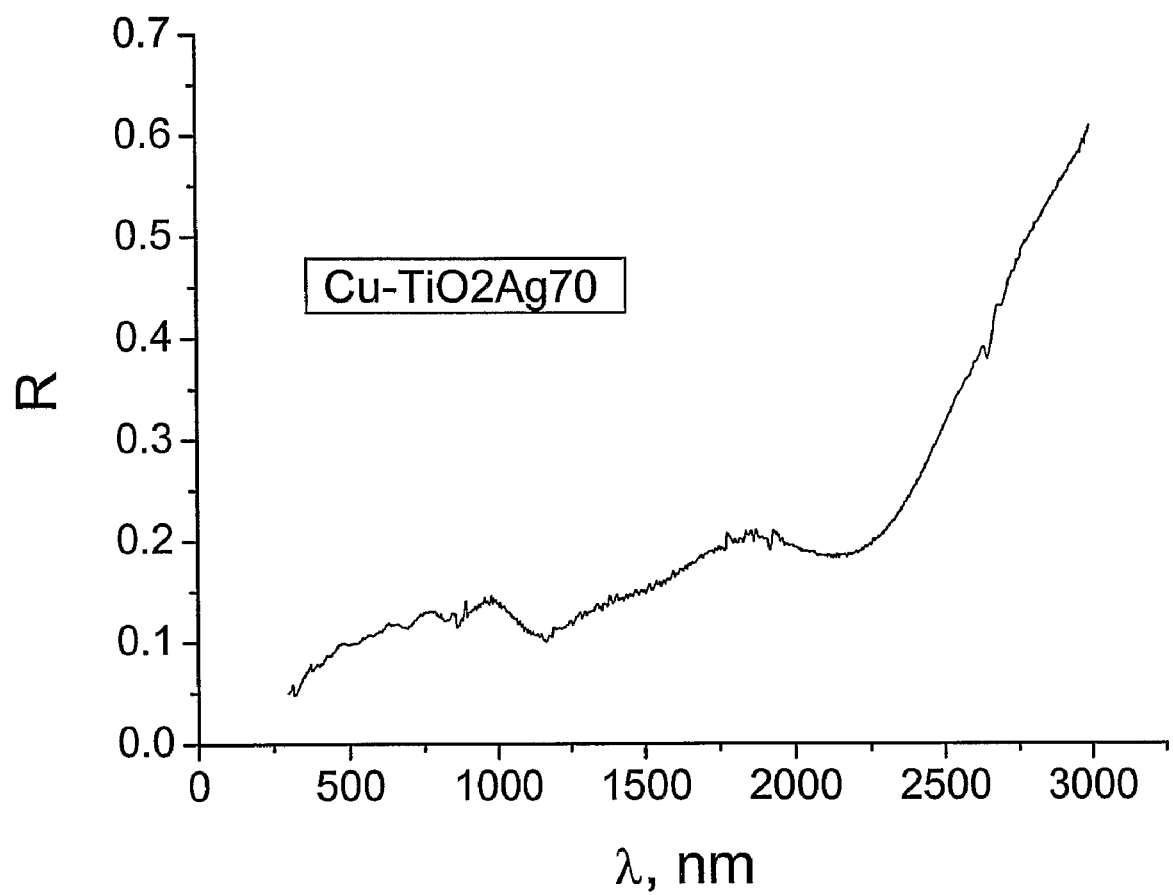
FIG. 3 shows the reflection analysis of a $TiO_2/Ag$ layer (100 nm) with a proportion by mass of silver of 70% on a copper substrate.

In the case of use of the inventive coatings in solar heating, they should typically be applied to metal sheets, especially to copper, aluminum and stainless steel. When this is done, a nitrogen atmosphere or forming gas atmosphere should be ensured, since the materials are otherwise oxidized and good adhesion might be impaired. FIG. 3 shows the result of a reflectivity measurement for a 100 nm-thick $TiO_2$/Ag layer (proportion by mass of silver 70%) on a copper sheet. The reflectivity in the visible spectrum is around or even below 10% and rises only slowly to approx. 20% up to about 2300 nm. Beyond 2300 nm, the reflectivity exhibits a sharp rise to about 60% at 3000 nm. For technical reasons (limitation of the measurement range), it has as yet been impossible to monitor the reflectivity further above 3000 nm. However, it is already clearly evident that, for example, copper sheets coated in accordance with the invention exhibit exactly the required properties of a selective solar absorber.

In the case of solar heating coatings, as well as the optical properties, the adhesion on the substrate and also chemical and thermal stability under climatic extremes (for example stoppage of the storage medium under intense solar irradiation) are also significant. Pure titanium dioxide satisfies these conditions outstandingly. This is not changed significantly by the enrichment with silver, though the $TiO_2$—Ag composition layer is antibacterial and possesses antifouling properties. This can be interpreted as an advantageous defense against undesired infestation—for example with fungal cultures. Of course, the sol-gel method, like the other known methods, also allows the generation of a depth-dependent material distribution, i.e., for instance, a silver gradient based on the layer thickness. It is thus possible to conceive of absorber layers which absorb light immediately above the metal substrate, whereas they comprise less and less silver toward the layer surface, such that the surface itself consists of pure $TiO_2$.

WORKING EXAMPLE

Preparation of the Sols

To prepare 200 ml of a 0.6 molar solution, 20 ml of 2-methoxyethanol and acetylacetone (Hacac) are initially charged in a beaker. Thereafter, titanium isopropoxide is added. The mixture is left to stir for 30 min.

As the second solution, 20 ml of 2-methoxyethanol are mixed with water. After stirring for 30 min, the aqueous solution is added to the titanium acetylacetone complex, and left to stir for a further 30 min.

For the silver solution, 20 ml of 2-methoxyethanol are initially charged in a beaker. Thereafter, $AgNO_3$ and pyridine are added thereto, and then this complex is likewise left to stir for 30 min. Thereafter, the silver solution can be added to the stabilized and hydrolyzed titanium solution. Four grams of polyethylene glycol 400 are preferably also added to the sol to improve the film formation properties.

After stirring for 30 minutes, the solution is made up to 200 ml with 2-methoxyethanol and then filtered.

Stoichiometries used:

Ti isoprop.: Hacac: $H_2O$=1:0.5:4 (mol)

$AgNO_3$: pyridine=1:15 (mol)

Starting Weights tor 200 ml Mixtures

| Mixture | Ti iso./g | Hacac/g | $H_2O$/g | $AgNO_3$/g | Pyridine/g |
|---|---|---|---|---|---|
| $TiO_2Ag30$ | 24 | 4 | 6 | 4.6 | 30 |
| $TiO_2Ag50$ | 24 | 4 | 6 | 10.7 | 6 |

Production of the Coatings

The samples are produced by means of spin-coating, dip-coating or spraying. Generally, the layers obtained are 100 nm thick. The pyrolysis is effected at 350° C. During the pyrolysis, the layers have to be illuminated constantly. After the pyrolysis, the samples appear significantly darker compared to unilluminated samples. Thereafter, the temperature is increased to 500° C. and crystallization is effected under light as above for 30 minutes. The restriction of the thermal treatment to temperatures up to at most 500° C. ensures that essentially polycrystalline $TiO_2$ forms in the anatase phase. This appears to be particularly favorable for the process described here.

The samples were illuminated in the laboratory tests by means of conventional incandescent bulbs (60 W, 100 W), by directing the lamps toward the samples and placing them at a distance of about 10-20 cm. The lamps emitted light over the entire visible spectrum and thermal radiation. It is likewise possible to illuminate the samples with a laser beam, preferably with a green laser of wavelength around 550 nm. Analysis of the incident light power density at the sample site was used to determine that it should preferably be set between 25 and 70 mW/cm².

The invention claimed is:

1. A process for producing a solar absorber coating, comprising the steps of: coating a substrate with a titanium precursor solution to obtain a titanium dioxide layer by the sol-gel technique and heat-treating the coated substrate to pyrolyze and crystallize the layer, characterized in that silver ions are added to the titanium precursor solution before the coating in such an amount that the heat-treated layer has a proportion by mass of silver between 50% and 80% and pyrolysis and crystallization of the layer are effected with illumination of the layer with visible light.

2. The process as claimed in claim 1, characterized in that individual layers of thickness of about 100 nanometers are created.

3. The process as claimed in claim 1, characterized in that the proportion by mass of silver in the heat-treated layer is between 50% and 70%.

4. The process as claimed in claim 1, characterized in that the heat treatment is effected at temperatures up to 500° C.

5. The process as claimed in claim 1, characterized in that a plurality of layers are arranged one on top of another, the individual layers differing in their silver content.

6. The process as claimed in claim 1, characterized in that the illumination of the layer is effected with incandescent lamps.

7. The process as claimed in claim 1, characterized in that the layer is illuminated with a light power density between 25 and 70 mW/cm².

8. The process as claimed in claim 1, characterized in that the layer is applied to a metallic substrate and heat-treated under a nitrogen or forming gas atmosphere.

9. The process as claimed in claim 8, characterized in that the metallic substrate comprises at least one of the metals copper, aluminum or stainless steel.

* * * * *